United States Patent [19]
Mendel et al.

[11] Patent Number: 6,038,755
[45] Date of Patent: Mar. 21, 2000

[54] INTEGRATED LEAD SUSPENSION TOOL BLOCK

[75] Inventors: Carl Robert Mendel, Santa Clara; Darrick Taylor Smith, San Jose, both of Calif.; Dennis James Veerkamp, St. Charles; Steven Harry Voss, Rochester, both of Minn.

[73] Assignee: International Business Machines Corporation, Armonk, N.Y.

[21] Appl. No.: 09/108,636

[22] Filed: Jul. 1, 1998

[51] Int. Cl.[7] ...................................................... B25B 27/14
[52] U.S. Cl. .......................... 29/281.4; 29/281.5; 29/468; 29/603.04
[58] Field of Search ............................ 29/407.09, 603.04, 29/737, 464, 281.1, 281.5, 281.4, 468; 269/47, 94, 238, 903

[56] References Cited

U.S. PATENT DOCUMENTS

| | | |
|---|---|---|
| 3,744,127 | 7/1973 | Brede et al. . |
| 4,509,251 | 4/1985 | Gyi et al. . |
| 4,518,940 | 5/1985 | Fuchs . |
| 4,520,555 | 6/1985 | Gyi et al. . |
| 4,615,721 | 10/1986 | Fuchs . |
| 4,625,393 | 12/1986 | Fuchs . |
| 4,854,036 | 8/1989 | DiGregorio . |
| 4,875,276 | 10/1989 | Yunokuchi et al. . |
| 4,964,941 | 10/1990 | Von Brandt et al. . |
| 5,033,184 | 7/1991 | Tandai et al. . |
| 5,623,759 | 4/1997 | Thorson et al. . |
| 5,680,213 | 10/1997 | Hunsaker et al. . |
| 5,732,459 | 3/1998 | Shiraishi et al. . |
| 5,742,996 | 4/1998 | Frater et al. . |

FOREIGN PATENT DOCUMENTS 197710   10/1977   U.S.S.R. .................................. 29/737

*Primary Examiner*—David P. Bryant
*Attorney, Agent, or Firm*—Douglas R. Millett; Michael E. Noe; Andrew J. Dillon

[57] ABSTRACT

A tool block holds an integrated lead suspension during assembly. The tool block has a number of features for precisely positioning the integrated lead suspension while transducer heads are being mechanically and electrically connected to it. The most critical feature is a movable datum clamping pin which is positioned to precisely engage a mount plate on the integrated lead suspension. Other features of the tool block include a platform support, a locating hole, a platform clamp and a pivot arm.

25 Claims, 3 Drawing Sheets

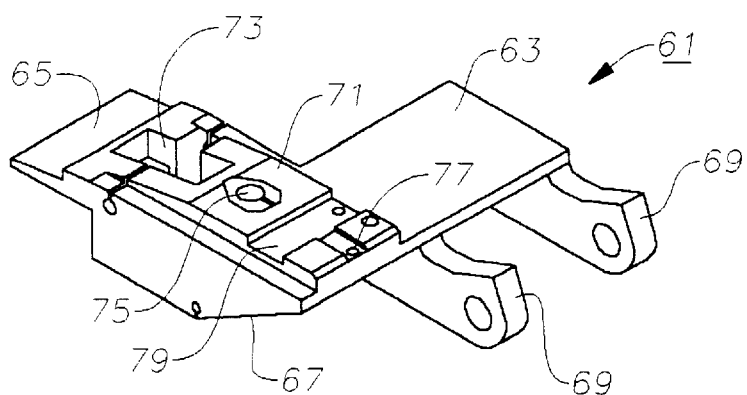
Fig. 4
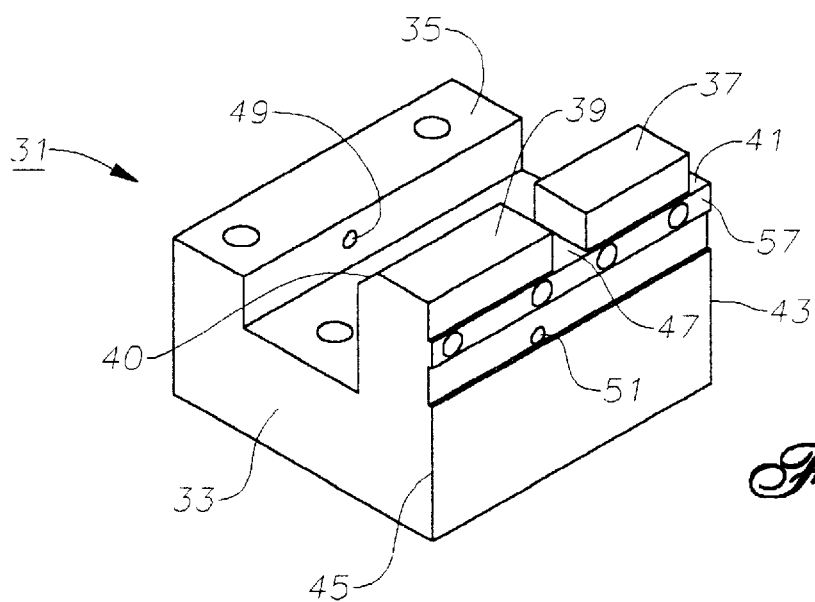
Fig. 5
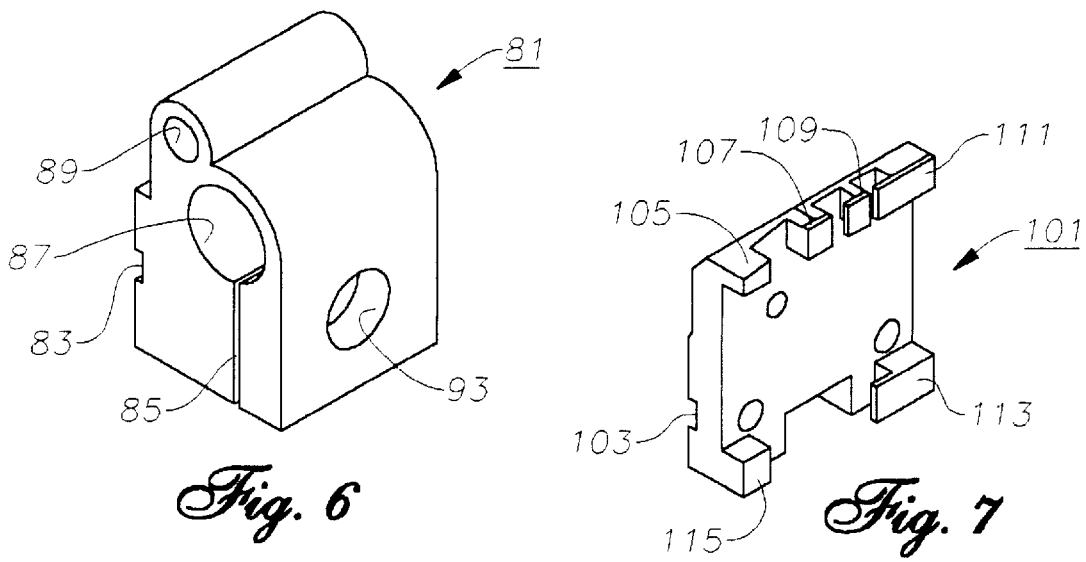
Fig. 6
Fig. 7

INTEGRATED LEAD SUSPENSION TOOL BLOCK

TECHNICAL FIELD

This invention relates in general to tool blocks and in particular to a tool block for assembling transducer heads to an integrated lead suspension.

BACKGROUND ART

Integrated lead suspensions (ILS) for computer hard disk drive head gimbal assemblies were recently introduced. The ILS differs from prior art suspension designs as it has electrical leads which are an integral part of the suspension. The integrated leads of the ILS are typically connected to the suspension by an ultrasonic bonding process. Integrated leads allow the assembly to have smaller suspension geometries than its predecessors. One problem encountered with the ILS during manufacturing is that the smaller geometries require very precise positioning of the suspension and the transducer head when they are mechanically and electrically connected.

The ILS has electrical "J-leads" which are terminated to the head. Pitch Static Attitude (PSA) is a process control attribute of the ILS assembly. Pitch can be controlled by properly positioning the J-leads with respect to the head. Unfortunately, PSA is very difficult to control using ILS as residual elastic stress is produced when the J-leads are pushed into the termination pads of the head. Residual elastic stress from the J-leads produces an elastic bending moment which affects PSA. The J-leads are also extremely sensitive to handling damage and must be accurately positioned over the pads of the head. In addition, the PSA can be easily affected during the removal of the ILS assembly from a tool block. The latter two problems are especially sensitive if manual assembly procedures are utilized. A method and apparatus for precision assembly of the ILS is needed.

DISCLOSURE OF THE INVENTION

A tool block holds an integrated lead suspension during assembly. The tool block has a number of features for precisely positioning the integrated lead suspension while transducer heads are being mechanically and electrically connected to it. The most critical feature is a movable datum clamping pin which is positioned to precisely engage a mount plate on the integrated lead suspension. Other features of the tool block include a platform support, a locating hole, a platform clamp and a pivot arm.

BRIEF DESCRIPTION OF THE DRAWINGS

FIG. 4 is an isometric view of a pivot arm of the tool block of FIG. 1.

FIG. 5 is an isometric view of a base of the tool block of FIG. 1.

FIG. 6 is an isometric view of a pivot bracket of the tool block of FIG. 1.

FIG. 7 is an isometric view of a mounting bracket of the tool block of Figure 1.

BEST MODE FOR CARRYING OUT THE INVENTION

Figure 1:
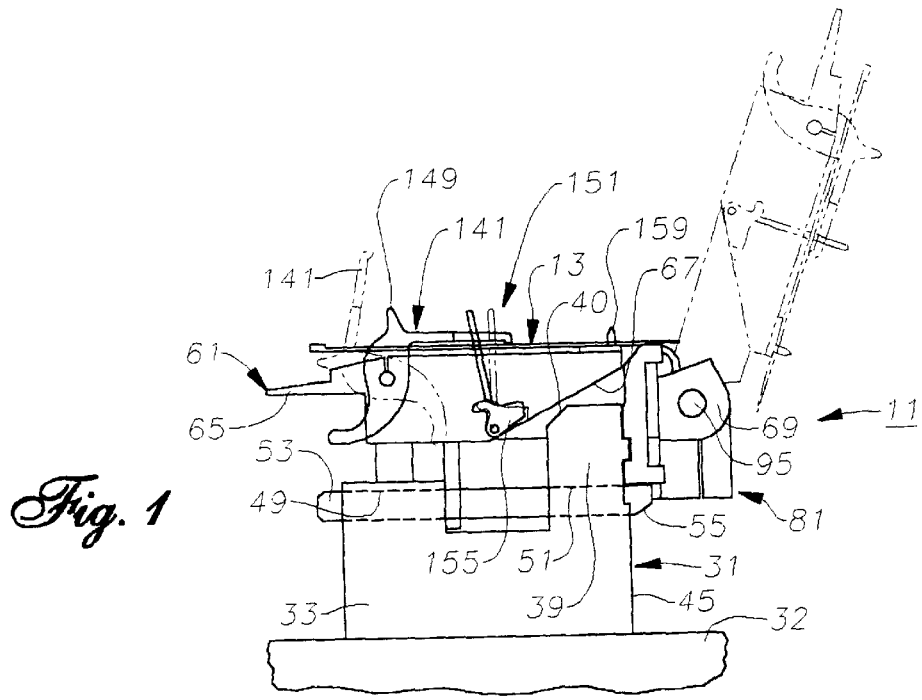
FIG. 1 is a side view of a tool block constructed in accordance with the invention and shown in both the open and closed positions.
Figure 2:
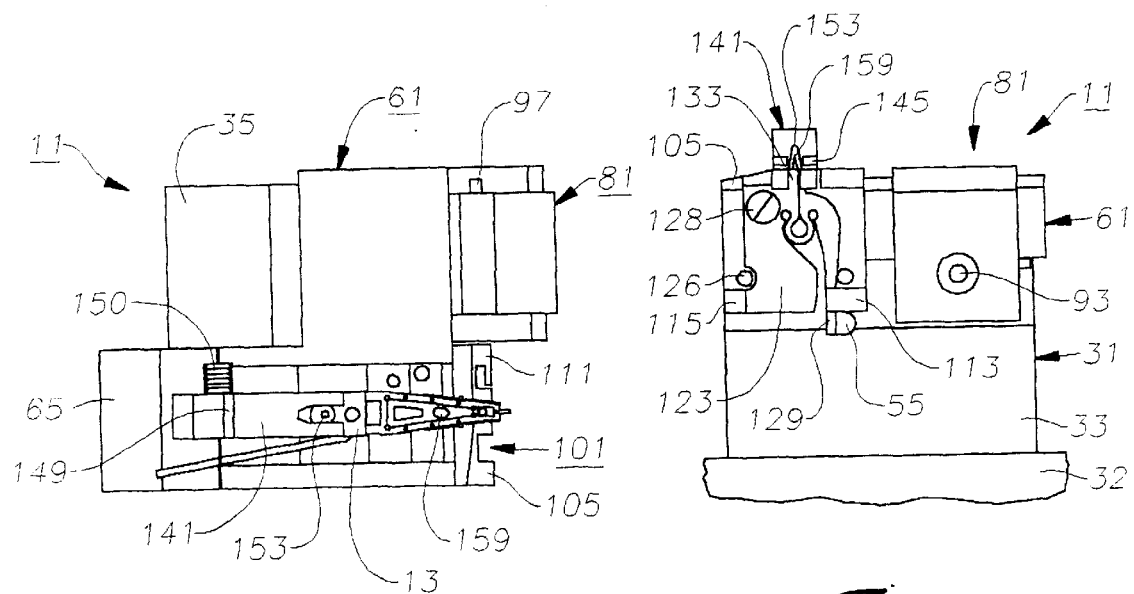
FIG. 2 is a top view of the tool block of FIG. 1 shown in the closed position.
Figure 3:
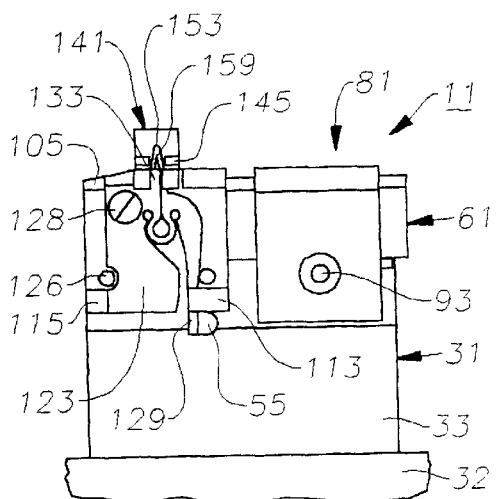
FIG. 3 is a front view of the tool block of FIG. 1 shown in the closed position.
Figure 11:
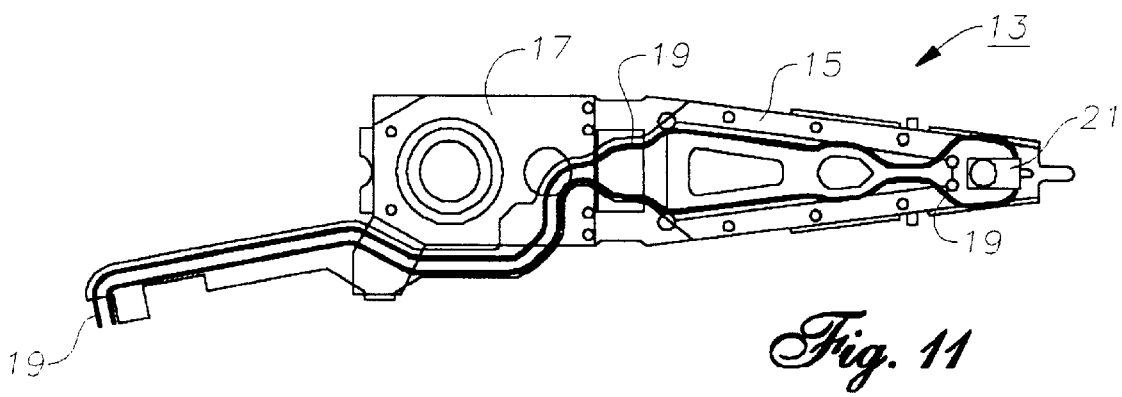
FIG. 11 is a plan view of an integrated lead suspension assembly.

Referring to FIGS. 1–3, a tool block assembly 11 for processing an integrated lead suspension assembly 13 is shown. Suspension assembly 13 (FIG. 11) comprises a cantilevered suspension 15 secured to and extending from a suspension platform 17. Suspension assembly 13 also has a plurality of integrated electrical leads 19 which extend along its length. One end of each lead 19 is ultrasonically bonded to transducer heads or sliders 21 during assembly.

Tool block assembly 11 comprises a number of primary components which must be assembled prior to its use. The largest component is a tool block base 31 which is permanently mounted to a pallet 32 (FIGS. 1 and 3). Although pallet 32 is provided to facilitate the use of assembly 11 during automated manufacturing of suspension assemblies 13, assembly 11 may also be used in manual assembly procedures as well.

Referring to FIG. 5, base 31 is generally rectangular with a number of orthogonal features. A square lower portion 33 forms the foundation for base 31. A rectangular formation 35 extends upward from a rearward third of lower portion 33 along its rearward edge. Formation 35 has the same width as lower portion 33. Two castellations 37, 39 extend upward from a forward third of lower portion 33 along its forward edge. Castellations 37, 39 are asymmetrical and are each less than half the width of lower portion 33. Castellation 39 has a chamfer 40 on an upper rearward edge. A square notch 41 offsets castellation 37 from a side edge 43 of base 31. Castellation 39 is flush with an opposite side edge 45. A second square notch 47 separates castellations 37, 39 from each other. A pair of coaxial holes 49, 51 extend through formation 35 and castellation 39, respectively. As shown in FIG. 1, a round pin 53 having a chamfer 55 on a forward end extends through holes 49, 51 and protrudes from either end of base 31. A square rib 57 extends horizontally across the entire width of the forward surface of base 31.

Referring to FIG. 4, a second major component of assembly 11 is pivot arm 61. Pivot arm 61 is a generally planar member with an L-shaped body 63 when viewed from above. Body 63 is generally trapezoidal when viewed from the side. A flat lift tab 65 extends horizontally rearward from body 63. A lower forward portion 67 is inclined at an approximately 30° angle and extends from a forward edge of body 63. A pair of vertical, flat fingers 69 extend symmetrically forward from one side of the forward edge of body 63. The opposite side of body 63 has a detailed raised platform 71 on an upper surface. A rectangular hole 73 is located in a rearward portion of platform 71 and extends downward completely through body 63. Platform 71 also has a centrally located round hole 75 and a round hole 77 at its forward edge. Holes 73, 75 and 77 are all centered and aligned with one another from front to back on platform 71. A shallow rectangular notch 79 separates holes 75 and 77 from one another.

Referring now to FIGS. 1 and 6, pivot arm 61 is attached to base 31 through pivot bracket 81. Like the other components, pivot bracket 81 is generally rectangular but has a rounded upper end. A square recess 83 extends horizontally across a backside of pivot bracket 81 and is provided for aligning with and engaging square rib 57 on base 31. Pivot bracket is split along a vertical slot 85 which intersects a large transverse hole 87. Another transverse hole 89 is located above, rearward and parallel to hole 87. A third hole 91 is longitudinal and is provided for receiving a fastener 93 (FIG. 3) for securing pivot bracket 81 to base 31. As shown in FIGS. 1 and 2, pivot arm 61 is pivotally joined to pivot bracket 81 by inserting a pin 95 through fingers 69 and hole 87. When a spring-biased pin 97 is mounted in hole 87, pivot arm 61 may be pivoted and locked from movement in either its horizontal position (FIGS. 1–3), or in its raised position (indicated by phantom lines in FIG. 1). Pivot arm 61 pivots approximately 110° between its horizontal (closed) and raised (open) positions.

As shown in FIGS. 1–3 and 7, assembly 11 also comprises a mounting bracket 101. Mounting bracket 101 is a generally rectangular, vertical member which fastens to a front surface of castellation 39 and body 33. Like pivot bracket 81, mounting bracket 101 has a square recess 103 which extends horizontally across its backside for aligning with and engaging square rib 57 on base 31. Mounting bracket 101 also has numerous short orthogonal protrusions 105, 107, 109, 111, 113, 115 which extend from its forward surface adjacent to its upper and lower edges. Protrusions 105–115 are provided for precisely engaging a spring clamp 121 (FIG. 10), described below.

Figure 10:
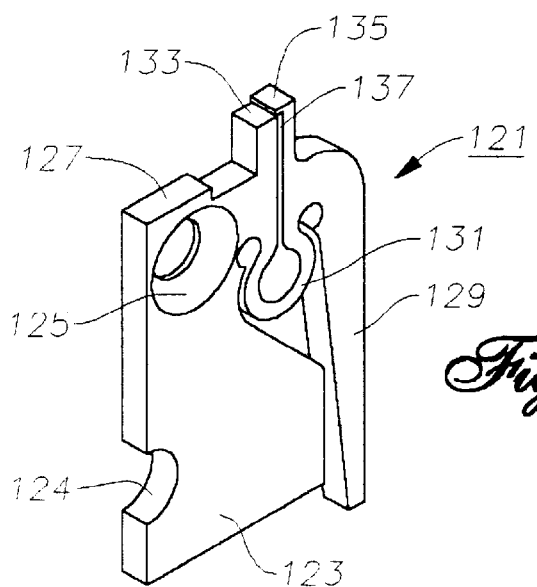
FIG. 10 is an isometric view of a spring clamp of the tool block of FIG. 1.

Referring now to FIG. 10, spring clamp 121 is a flat member with several S-shaped configurations. Spring clamp 121 has a generally planar body 123 with a notch 124 along a side edge for accommodating a fastener 126 (FIG. 3), and a through-hole 125 near its upper edge for a fastener 128. A raised square rib 127 protrudes from the upper edge of body 123 and is received between protrusions 105, 107 on mounting bracket 101. A long, downward-pointing tine 129 is located on an opposite side of body 123. Tine 129 has a vertical dimension which is slightly longer than and extends below body 123. Tine 129 is received by protrusion 113 on mounting bracket 101 and is designed to be engaged by chamfer 55 on pin 53 during operation. Tine 129 and body 123 are joined by a U-shaped member 131 which forms a pair of asymmetrical, upward-pointing tines 133, 135. Tines 133, 135 are separated by a vertical slot 137 and engage protrusions 107, 109 and 111 on mounting bracket 101.

Figure 8:
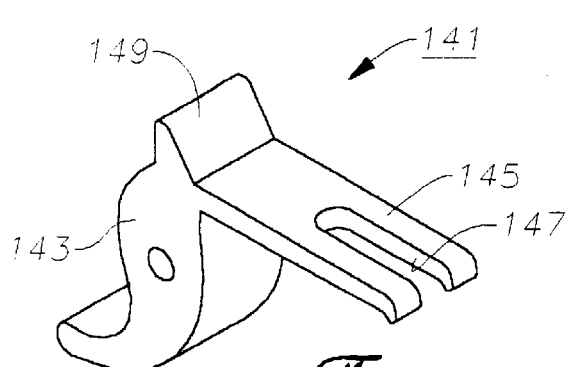
FIG. 8 is an isometric view of a platform clamp of the tool block of FIG. 1.

Referring to FIG. 8, a platform clamp 141 having a generally seahorse-shaped configuration when viewed from the side is shown. Platform clamp 141 has an S-shaped body 143 and a pair of symmetrical arms 145 which extend horizontally forward from body 143 and are separated by a U-slot 147. A trigger-type member 149 extends upward from body 143. Platform clamp 141 is pivotally mounted in rectangular hole 73 in pivot arm 61 so that it may be rotated approximately 90° in a vertical plane between a closed position (FIGS. 1–3) and an open position (indicated by phantom lines in FIG. 1). Platform clamp 141 is biased forward by a spring 150 (FIG. 2) which is located on its side in hole 73.

Figure 9:
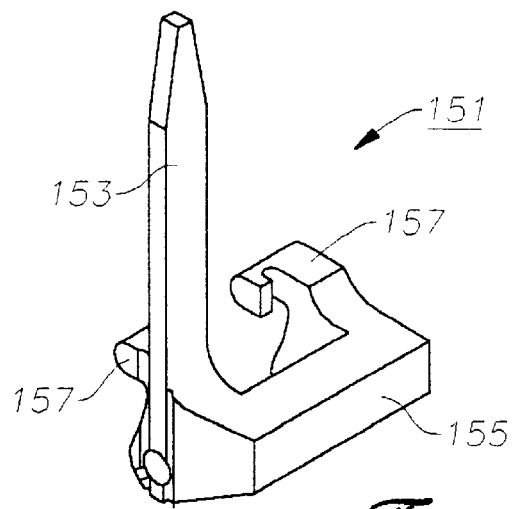
FIG. 9 is an isometric view of a pivot pin of the tool block of FIG. 1.

The final component of assembly 11 is shown in FIG. 9. A movable datum or pivot pin 151 has a pointed arm 153 extending upward from a generally rectangular body 155. Arm 153 is located to one side of body 155 while a pair of curved fingers 157 extend symmetrically rearward from body 155. Fingers 157 are provided for engaging an internal spring mechanism (not shown) in pivot arm 61. As shown in FIGS. 1–3, arm 153 extends upward through hole 75 when pivot pin 151 is mounted in pivot arm 61. Pivot pin 151 is biased to a slightly inclined position which is offset from vertical in a rearward direction by approximately 20° (FIG. 1). Pivot pin 151 may be pivoted to an upright vertical position (indicated by phantom lines in FIG. 1). A small pointed pin 159 is located adjacent to arm 153 in hole 77. Pin 159 extends upward from hole 77 and is fixed from movement.

In operation, tool block assembly 11 is assembled as described above prior to processing integrated lead suspension assemblies 13. If assembly 11 is to be used in automated procedures, pallet 32 is required for proper positioning and manipulation on a conveyor processing system (not shown).

Prior to receiving a suspension assembly 13, tool block assembly 11 is configured as shown by the solid lines in FIG. 1. Pivot clamp 141 is rotated counterclockwise to its open position (indicated by phantom lines in FIG. 1) and pin 53 is activated to the right. By actuating pin 53, arm 153 of pivot pin 151 is rotated clockwise (indicated by phantom lines in FIG. 1) to receive a suspension assembly 13 which is dropped or placed on platform 71 of pivot arm 61. As assembly 13 is placed on pivot arm 61, arm 153 inserts through a hole in suspension platform 17 to precisely locate suspension assembly 13 in a lengthwise direction. Pivot clamp 141 is returned to the closed position (FIGS. 1–3) so that fingers 145 contact and hold suspension platform 17 against platform 71 and arm 153 is located in U-slot 147 of pivot clamp 141. Pin 53 is returned to the left position so that pivot pin 151 will overcome the clamping frictional force of clamp 141 and translate suspension 13 against datum pin 159. Pin 151 also serves to maintain angular alignment with respect to pin 159. Suspension assembly 13 is now flat against platform 71 for its entire length and the forward ends of leads 19 are perfectly positioned relative to tool block assembly 11. The combination of arm 153 and pin 159 provides high speed, automatic centering and positioning. Pivot pin 151 resists translational movement of assembly 13 when the it is supported on platform 71.

With suspension assembly 13 securely and precisely located in tool block assembly 11, spring pin 97 (FIG. 2) is depressed so that pivot arm 61 may be released and pivoted 110° to its engagement position (indicated by phantom lines in FIG. 1). After pivot arm 61 reaches the engagement position, spring pin 97 pops out on the opposite side of fingers 69 to lock it in that position. The obtuse angle of the pivot arm 61 enables automation features to be located just above the tool block assembly 11 for head 21. Head 21 is then loaded in the tool block assembly by placing at the tip of slot 137 between tines 133, 135. Pin 53 is actuated forward so that its chamfer 55 compresses the lower end of tine 129 on spring clamp 121. Compression of tine 129 opens U-member 131 and, thus slot 137 so that head 21 may be received between tines 133, 135. Pin 53 is then retracted and tines 133, 135 close on head 21 to hold it in place. Adhesive is then applied to the backside of head 21. Pivot arm 61 is returned to its starting position by again depressing spring pin 97 so that fingers 69 are disengaged and may rotate downward. Spring pin 97 pops back out when pivot arm 61 is horizontal so that pivot arm 61 is again locked in place. As pivot arm 61 swings downward, head 21 is bonded to leads 19 to complete the precision assembly 13.

To remove completed suspension assembly 13 from tool block assembly 11, pin 53 is actuated to the right so pivot pin 151 will translate assembly 13 slightly forward to ensure that head 21 is free from spring clamp 121. Next, pivot clamp 141 is again pivoted to its open position (indicated by phantom lines in FIG. 1). Once in the forward position, assembly 13 can be safely removed from tool block assembly 11 without affecting pitch static attitude. This process is repeated for each integrated lead suspension assembly 13.

The invention has several advantages. The locating pins of the tool block accurately position the ILS and its electrical leads relative to the head to minimize resultant bending stress. The tool block is pelletized and designed for automated processing to enhance quality. The components of the tool block permit the ILS assembly to be safely removed from the tool block without affecting the PSA. In addition, the tool block may be fabricated by relatively inexpensive wire electronic discharge machining.

While the invention has been shown or described in only some of its forms, it should be apparent to those skilled in the art that it is not so limited, but is susceptible to various changes without departing from the scope of the invention.

I claim:

1. A tool block assembly for processing an integrated lead suspension having a suspension body with a pair of spaced apart holes and a slider, comprising:
   a base;
   a platform which is adapted to support the suspension body;
   a datum pin pivotally mounted to and extending away from the platform to allow relative movement therebetween, the datum pin registering with one of the holes in the suspension body and resisting translational movement of the suspension body when the suspension body is supported on the platform;
   a stationary pin rigidly mounted to the platform and adapted to register with the other of the holes in the suspension body;
   a clamp pivotally mounted to the platform and movable between open and closed positions to retain the suspension body against the platform while the suspension body is located in the suspension body retainer;
   a slider holder mounted to the base and being adapted to releasably retain the slider; and
   a mechanism for causing relative movement between the platform and the slider holder so that the slider makes contact with and adheres to the suspension body.

2. The tool block assembly of claim 1 wherein the mechanism comprises an arm which is pivotally mounted to the base, such that when the arm is moved from a second position to a first position, the arm brings the suspension body into contact with the slider to adhere the slider to the suspension body; and wherein
   the platform is mounted to a surface of the arm.

3. The tool block assembly of claim 1 wherein the datum pin is spring-biased against the platform to precisely locate the suspension body relative to the slider holder, and wherein the datum pin is biased away from the stationary pin to place the suspension body in tension during operation.

4. The tool block assembly of claim 1 wherein the datum pin has a pivotal range of motion of approximately 20°.

5. The tool block assembly of claim 1 wherein the slider holder is a spring clamp having a pair of tines for holding the slider.

6. The tool block assembly of claim 1, further comprising:
   a pivot bracket mounted between the base and the mechanism; and
   a mounting bracket mounted between the base and the slider holder.

7. The tool block assembly of claim 1 wherein the mechanism has a pivotal range of motion of approximately 110°.

8. The tool block assembly of claim 1, further comprising an actuation pin extending through the base for slidably engaging and actuating the slider holder.

9. The tool block assembly of claim 1, further comprising a pallet mounted to a lower surface of the base for facilitating the use of the tool block assembly during automated manufacturing.

10. A tool block assembly for processing an integrated lead suspension having a suspension body and a slider, comprising:
    a base;
    an arm pivotally mounted to the base and having a platform which is adapted to support the suspension body, the arm being movable relative to the base between first and second positions;
    a stationary pin rigidly mounted to the platform of the arm and adapted to stationarily engage the suspension body;
    a datum pin pivotally mounted to the arm and biased away from the stationary pin, the datum pin engaging the suspension body and placing it in tension during operation;
    a clamp pivotally mounted to the arm and movable between open and closed positions to retain the suspension body against the platform of the arm while the suspension body is located in the suspension body retainer;
    a slider holder mounted to the base and being adapted to releasably retain the slider; and wherein
    when the arm is moved from the second position to the first position, the arm brings the suspension body into contact with the slider to adhere the slider to the suspension body.

11. The tool block assembly of claim 10 wherein the datum pin is spring-biased against the arm.

12. The tool block assembly of claim 10 wherein the datum pin has a pivotal range of motion of approximately 20°.

13. The tool block assembly of claim 10 wherein the slider holder is a spring clamp having a pair of asymmetrical tines for holding the slider.

14. The tool block assembly of claim 10, further comprising a spring mounted between the clamp and the arm for biasing the clamp to a closed position against the platform.

15. The tool block assembly of claim 10, further comprising:
    a pivot bracket mounted to the base and carrying the arm for allowing the arm to pivotally articulate relative to the base; and
    a mounting bracket mounted to the base for capturing the slider holder.

16. The tool block assembly of claim 10 wherein the arm has a pivotal range of motion of approximately 110° between the first and second positions.

17. The tool block assembly of claim 10, further comprising an actuation pin extending slidably through a hole in the base, the actuation pin having a chamfer for slidably engaging and actuating the slider holder.

18. The tool block assembly of claim 10, further comprising a pallet mounted to a lower surface of the base for facilitating the use of the tool block assembly during automated manufacturing.

19. A tool block assembly for processing an integrated lead suspension having a suspension body and a slider, comprising:
    a base;

an arm mounted to the base and having a platform which is adapted to support the suspension body, the arm being movable relative to the base between first and second positions;

a datum pin pivotally mounted to the arm and extending away from the platform, the datum pin registering with a hole in the suspension body for resisting translational movement of the suspension body when the suspension body is supported on the platform;

a clamp pivotally mounted to the arm and movable between open and closed positions to retain the suspension body against the platform;

a spring mounted between the clamp and the arm for biasing the clamp to a closed position against the platform;

a spring clamp mounted to the base which is adapted to releasably retain the slider;

a pin rigidly mounted to the platform of the arm between the datum pin and the spring clamp, the pin registering with a hole in the suspension body; and wherein when the arm is moved from the second position to the first position, the arm brings the suspension body into contact with the slider to adhere the slider to the suspension body.

20. The tool block assembly of claim 19 wherein the datum pin is spring-biased against the arm to precisely locate the suspension body relative to the slider holder.

21. The tool block assembly of claim 19 wherein the datum pin has a pivotal range of motion of approximately 20°.

22. The tool block assembly of claim 19, further comprising:

a pivot bracket mounted between the base and the arm; and a mounting bracket mounted between the base and the slider holder.

23. The tool block assembly of claim 19 wherein the arm has a pivotal range of motion of approximately 110° between the first and second positions.

24. The tool block assembly of claim 19, further comprising an actuation pin extending through the base for actuating the slider holder.

25. The tool block assembly of claim 19, further comprising a pallet mounted to a lower surface of the base.

* * * * *

UNITED STATES PATENT AND TRADEMARK OFFICE
CERTIFICATE OF CORRECTION

PATENT NO.     : 6,038,755                                                   Page 1 of 1
DATED          : March 21, 2000
INVENTOR(S)    : Mendel et al.

It is certified that error appears in the above-identified patent and that said Letters Patent is hereby corrected as shown below:

<u>Column 5,</u>
Line 61, delete "a pivot bracket mounted between the base and the mechanism; and a mounting bracket mounted between the base and the slider holder" and insert
   -- a pivot bracket mounted to the base and carrying the mechanism for allowing the mechanism and the platform to pivotally articulate relative to the base; and
      a mounting bracket mounted to the base for capturing the slider holder --

Signed and Sealed this

Fourth Day of November, 2003

JAMES E. ROGAN
*Director of the United States Patent and Trademark Office*